United States Patent [19]

Eisenhaure

[11] 4,135,361
[45] Jan. 23, 1979

[54] SELF-CONTAINED HEAT GENERATING SYSTEM

[75] Inventor: David B. Eisenhaure, Hull, Mass.

[73] Assignee: The Charles Stark Draper Laboratory, Inc., Cambridge, Mass.

[21] Appl. No.: 735,748

[22] Filed: Oct. 26, 1976

[51] Int. Cl.² .............................................. F02C 3/20
[52] U.S. Cl. .................................. 60/39.02; 60/39.12; 60/39.46 R; 60/39.46 S; 126/263
[58] Field of Search .................. 60/39.46 R, 39.46 G, 60/39.46 S, 39.46 M, 39.02, DIG. 9, 39.12; 123/1 A, 3; 48/199 R, 199 FM, 116, 117; 126/263

[56] References Cited

U.S. PATENT DOCUMENTS

| | | | |
|---|---|---|---|
| 3,230,707 | 1/1966 | Rothmayer et al. | 60/39.46 M |
| 3,898,794 | 8/1975 | Ariga | 60/39.46 M |
| 3,975,913 | 8/1976 | Erickson | 126/263 |

Primary Examiner—Carlton R. Croyle
Assistant Examiner—L. J. Casaregola

Attorney, Agent, or Firm—Weingarten, Maxham & Schurgin

[57] ABSTRACT

A closed cycle-high energy density heat generating system. In the heat generating system hydrogen peroxide is fed from a vessel at a controlled rate through a catalytic converter to produce water vapor and oxygen. A first reaction heat transfer vessel receives the water vapor and oxygen mixture from the converter and combines hydrogen provided by a second reaction heat transfer with the received oxygen in a combustion reaction which produces water and heat. The water produced by the first reaction heat transfer vessel is applied to the second reaction heat transfer vessel in which it reacts with an active metal to produce a metal hydroxide, hydrogen which is recycled to the first reaction heat transfer vessel, and further heat. The flow of gases and liquids in the system is controlled by diverse temperature and pressure sensors placed throughout the system to control heat generation and system stability. The heat generated in the first and second reaction heat transfer vessels is extracted to high or low pressure circulation systems in which it is used for direct heating or conversion to mechanical energy.

18 Claims, 3 Drawing Figures

4,135,361

SELF-CONTAINED HEAT GENERATING SYSTEM

FIELD OF THE INVENTION

This invention relates to a closed cycle, high energy density heating system and more particularly to a closed cycle high energy density heating system employing hydrogen peroxide and an active metal as reactors.

BACKGROUND OF THE INVENTION

There are several applications requiring an efficient source of energy which must be self-contained due to the unavailability of elemental fuel inputs such as oxygen and the combustible material. Such applications are typically in remote areas as for example in undersea or space environments where the additional requirement of high energy density, that is high kw output per pound of heat system, is an important design objective. In addition, certain applications such as in undersea motors, require that no exhaust product be given out by the energy system. Finally, some applications further require the ability to control the level of power output in response to system energy demands and the ability to conserve fuel during periods of low or no energy need. At the same time, system efficiency should be maintained high at all levels of controlled output including very high energy, or "burst" energy output modes.

Among available energy sources, the fuel cell is typically employed in remote regions requiring controlled energy sources usable over substantial periods of time. As measured in terms of energy density, the fuel cell provides a relatively low energy output per pound of energy supply system and is thus inefficient for use in many remote applications.

BRIEF SUMMARY OF THE INVENTION

In accordance with the teaching of the present invention a closed cycle heat source is provided in which a high energy output per pound of heat generating system is provided and in which the power output level is fully controllable over a range from very high or burst mode energy output levels to low or no energy output levels, and further in which the system provides no exhaust outputs. The energy source of the present invention employs hydrogen peroxide and a reactive metal such as lithium as fuel sources. The hydrogen peroxide is dissociated to water vapor and oxygen which is combusted with hydrogen to produce further water. This water is reacted with the reactive metal to produce a metal hydroxide and hydrogen which is combusted with the oxygen released from the hydrogen peroxide. In all the processes of the invention including disassociate, hydrogen combustion, and reaction of the reactive metal with water, energy is generated which is made available as a system output typically through a heat exchange to a closed cycle circulating system which can either directly apply the heat energy as such, or convert it to a mechanical energy form.

The rate of use of the hydrogen peroxide and lithium fuels is internally controlled within the system for stable operation and may be further externally controlled to regulate the level of energy output.

Several exemplary embodiments of the invention disclose the use of the energy source for direct heating of, for example, a deep sea diving suit, for powering a Brayton cycle engine for high efficiency conversion of the heat energy to mechanical work or in powering a turbine converter to generating high efficiency motive power.

DESCRIPTION OF THE DRAWINGS

These and other features of the present invention are more fully described below in the solely exemplary and nonlimiting detailed description and accompanying drawing, of which.

DETAILED DESCRIPTION OF THE INVENTION

The present invention contemplates an energy source in which hydrogen peroxide and an active metal are consumed as fuels in a closed cycle reaction generating heat and/or pressure as the energy output. In a first embodiment, the heat generated in the reaction is directly applied to heat a desired region. Such a system is shown more particularly in FIG. 1.

Figure 1:
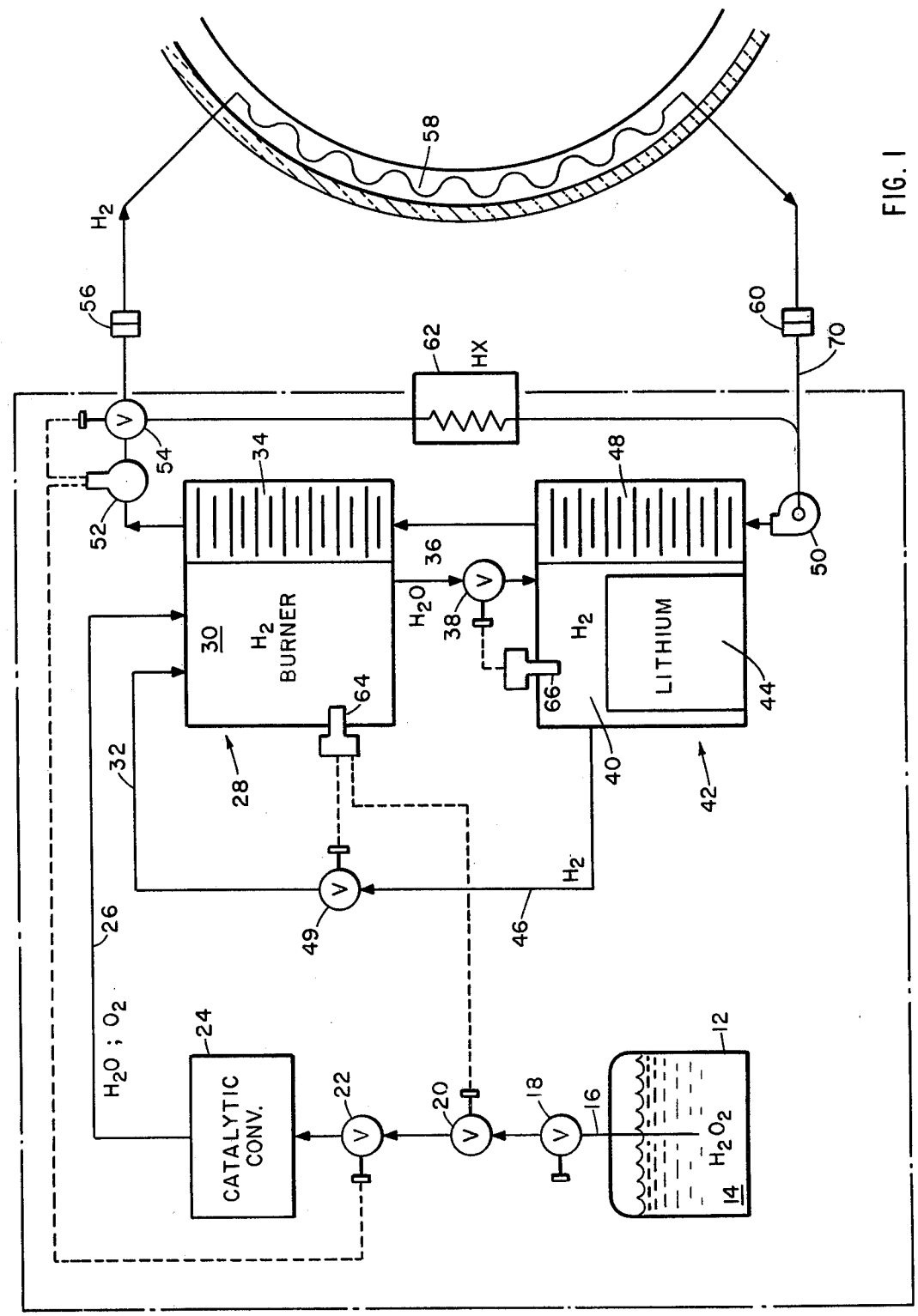
FIG. 1 is a diagram of a heating system according to the present invention in which the heat energy is directly applied for heating of a region.

Referring to FIG. 1, the energy source according to one embodiment of the invention is shown to include a reservoir or vessel 12 containing a supply 14 of hydrogen peroxide. The hydrogen peroxide in the vessel 12 is applied via a conduit 16 through an externally controlled valve 18, and automatically controlled valves 20 and 22 into a catalytic converter 24. The valve 18 functions to permit external control of the flow of hydrogen peroxide from the vessel 12 to thereby adjust the system output power. The valves 20 and 22 are operated in response to pressure and temperature sensors located elsewhere in the system to control system reaction rates through control over the supply of hydrogen peroxide to the catalytic converter 24.

The hydrogen peroxide supplied to the catalytic converter 24 is disassociated into oxygen and water vapor which are communicated through a conduit 26 to a first reaction heat transfer vessel 28. The catalytic converter 24 may comprise a matrix of silver or platinum wires to augment the disassociation of the hydrogen peroxide in an exothermic reaction resulting in the generation of water vapor and oxygen gas at high pressure. The resulting pressure drives the mixture of oxygen and water vapor through the conduit 26 into the reaction vessel 28.

The vessel 28 includes a combustion chamber 30 which receives the oxygen and water vapor along with a supply of gaseous hydrogen from a conduit 32. The mixed hydrogen and oxygen combust (using the heat from the adiabatic disassociation of hydrogen peroxide) within the chamber 30 resulting in the generation of heat and water as a chemical product. The combination of pressure generated by the hydrogen - oxygen reaction and the removal of heat from the vessel 28 through a heat exchanger 34 causes the water output product in a conduit 36 typically to be in the liquid phase.

The water product in the conduit 36 from the vessel 28 is applied through a valve 38 (which includes some means for promoting flow toward chamber 40 such as a wick or pump) to a reaction chamber 40 of a second reaction heat transfer vessel 42. The reaction chamber 40 includes a supply 44, typically pelletized, of an active metal such as lithium which acts upon the input water to generate a hydroxide of the active metal and gaseous hydrogen. The gaseous hydrogen is supplied through a conduit 46 to a control valve 49 from which it is applied through the conduit 32 into the combustion chamber 30 of the first reaction heat transfer vessel 28. The reaction of lithium with water in the combustion chamber 40 generates additional heat which is extracted through a heat exchanger 48 for use external of the system as an energy output of the closed cycle heat source.

In the embodiment of FIG. 1, the generated heat is directly used in the form of thermal energy in a closed loop circulating system. The closed loop includes a pump 50 circulating a gas such as hydrogen sequentially through the heat exchangers 48 and 34, a temperature sensor 52, and flow diverter valve 54 through a gas coupling 56 to a heating blanket 58, which may typically be a part of a deep sea diving suit or other element for the application of heat. The circulating gas from the heating blanket 58 is returned through a fluid coupling 60 to the circulating pump 50. The valve 54 is responsive to the temperature sensed by the thermal sensor 52 to divert the circulating gas through a heat exchanger 62, which may typically provide for release of the heat to the environment. The diversion through the heat exchanger 62 is provided for safety purposes to prevent excessive heat from being applied to the heating blanket 58. In the case where the heating blanket 58 is employed for direct heating of the human body, the valve 54 may typically be operated to divert the hot gas at temperatures of 100° F. or above.

The thermal sensor 52 also provides proportional control over the valve 22 to control the rate of hydrogen peroxide applied to the catalytic converter 24 in opposite proportion to the temperature up to the temperature of 95° F. at which point it cuts off the flow to the converter 24. The temperature 95° is again selected with a view to the application of the FIG. 1 embodiment to the heating of a diver suit. It should be clear that other temperatures may be selected for control purposes depending upon the temperature limitations of the apparatus employing the heat generated by the system.

A pressure sensor 64 is operative to sense pressure within the combustion chamber 30 to control the valves 20 and 49. The valve 20 operates to cut off the flow of hydrogen peroxide to catalytic converter 24 when the pressure in the chamber 30 exceeds, for example, 60 psi, while the valve 49 operates through the sensor 64 to control the pressure within the combustion chamber 30 to approximately 30 psi. Finally, a pressure sensor 66 is located to sense pressure within the reaction chamber 40 and control the valve 38 applying liquid water to the chamber 40 for a pressure of 90 psi within the chamber 40. The pressures of 30 and 90 psi for the chambers 30 and 40 are selected in order to provide pumping of the hydrogen from the chamber 40 through valve 49 into the chamber 30 at relatively low pressures throughout. It is clear that other pressures than these typical pressures shown may be selected for operation of the system.

Figure 2:
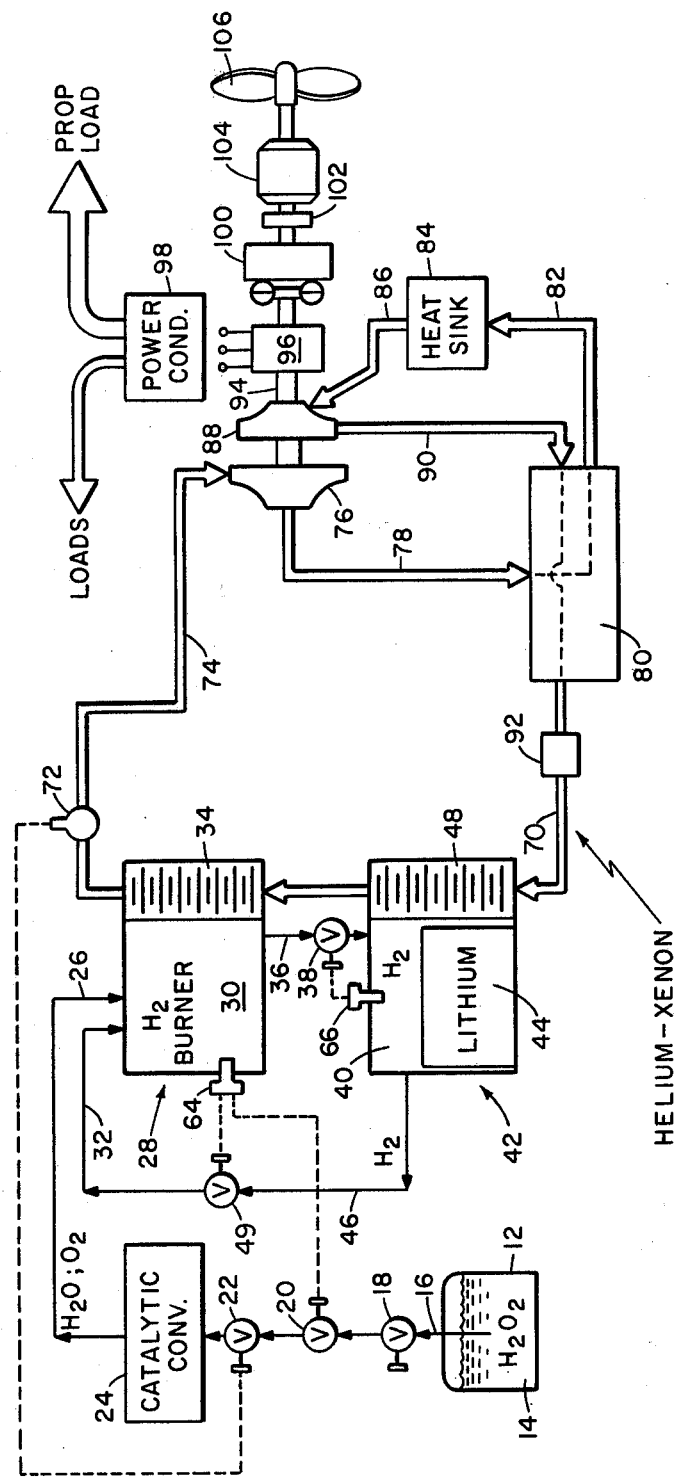
FIG. 2 is a diagram of a heat source according to the present invention in which the heat energy output is applied to a high efficiency Brayton cycle engine.

With reference now to FIG. 2, there is shown a heat generating system according to the present invention in which heat is generated in first and second reaction heat transfer vessels 28 and 42 in the manner shown above in FIG. 1 with the heat available in the heat exchangers 34 and 48 applied in a circulating loop for energizing a Brayton cycle engine. Accordingly, a conduit 70 supplies a heat transfer gas such as helium, xenon or a mixture, sequentially through the heat exchangers 48 and 34 and through a temperature sensor 72 operating to control valve 22 supplying hydrogen peroxide to the catalytic converter 24. The sensor 72, in the application for driving a Brayton cycle engine, is selected to control the temperature of the flow through the sensor 72 into a conduit 74 at approximately 2060° R for application to a first, or power turbine 76 of a Brayton cycle engine. Gas is exhausted from the turbine 76 in a conduit 78 where it is applied through a recuperator or heat exchanger 80 which heats the exhaust of the second stage with the exhaust from the first stage. Gas from recuperator 80 is applied through a conduit 82 into a heat sink 84 which removes further heat from the first stage exhaust. Gas from the heat sink 84 is applied through a conduit 86 to an input of a further, compressor turbine 88 (i.e., a turbine acting as a compressor) of the Brayton cycle engine. The exhaust from the turbine 88 is applied in a conduit 90 through the recuperator 80 and a pump 92 back to the heat exchangers 48 and 34.

The mechanical energy imparted to a shaft 94 of turbines 76 and 88 by the Brayton cycle engine may be utilized in several ways including conversion to electrical energy in a generator 96 where it is made available through a power controller 98 to various electrical energy users. In the case where the energy source is employed on a sea-going vessel, the electrical energy supplied by the power controller 98 may be used throughout the vessel for such applications as heating, lighting or the operation of control or propulsion equipment. In addition, when used upon a sea-going vessel, the energy in shaft 94 may be applied through a clutch 100, gear box 102 and pressure bearing 104 in the vessel hull to a propeller 106 for ship propulsion.

Figure 3:
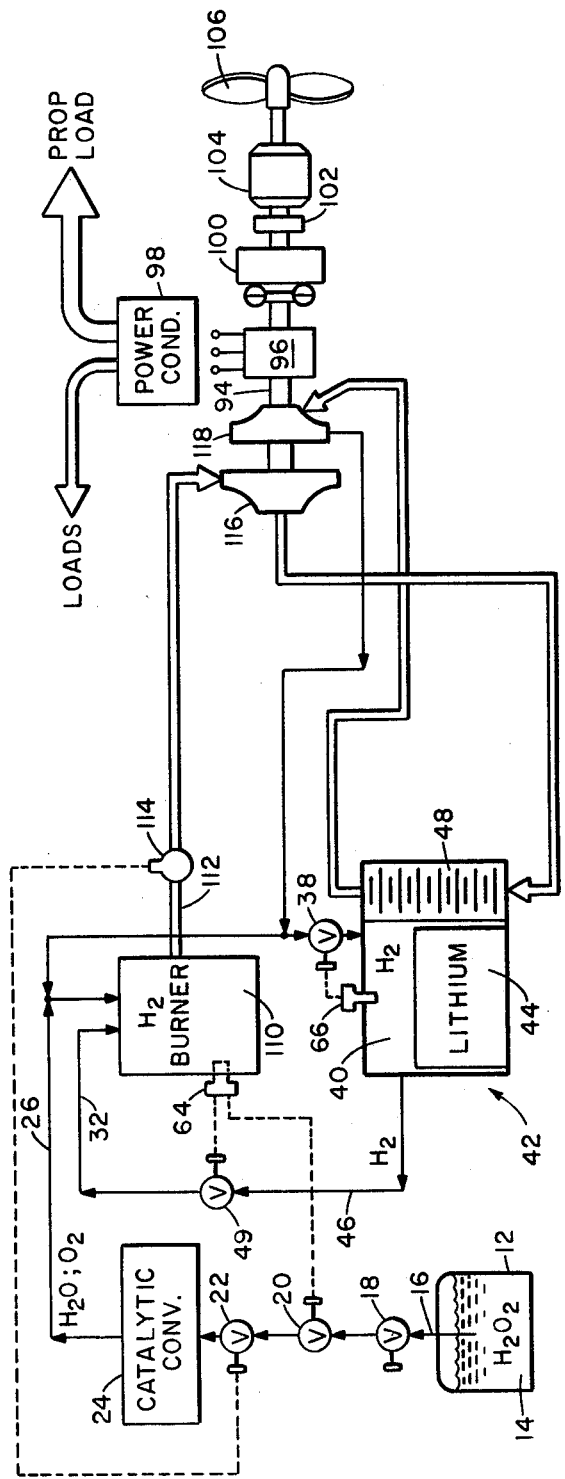
FIG. 3 is a diagram of a heat system according to the present invention with a heat energy output applied for high efficiency conversion to a propulsion force.

With reference now to FIG. 3, there is shown a further embodiment of the present invention utilizing a conversion of the energy provided in the closed cycle reaction system in a two-stage turbine providing mechanical energy output. The embodiment of FIG. 3 utilizes essentially momentum energy generated in the closed cycle reaction system for driving a two-stage turbine directly from the water vapor produced in the reaction system without the compression stage employed above. Accordingly, the first reaction transfer vessel for use in the system of FIG. 3 includes only a combustion chamber 110 without a heat exchanger such that the water combustion product (typically in vapor form) is applied directly at an output conduit 112 for application through a temperature sensor 114 to a first turbine power stage 116. The exhaust from the first turbine stage 116 is repressurized and heat energized in a heat exchanger 48 of the second reaction transfer vessel 42 with the pressurized and energized output thereof applied to a second power stage 118 of the turbine. The exhaust from the stage 118 is applied as cooled water vapor at an input to the reaction stage 42 through valve 38, as well as combined with the products from the catalytic converter 24 applied to combustion chamber 110. The pressure sensors 64 and 66 operate to maintain a pressure of 1000 psi within the combustion chamber 110 and a pressure of 1060 psi within the reaction chamber 40 as typical numbers for use in the system. The temperature sensor 114 also controls the flow of hydrogen peroxide to produce a temperature in the conduit 112 of approximately 2060° R as in the Brayton cycle engine of FIG. 2.

As in all cases, the rate of heat generated is controlled by control of valve 22 permitting a wide range of power output from a very low level to an extremely high, or burst, mode of energy generation while maintaining a high efficiency in the energy supply system. A typical reaction equation is as follows:

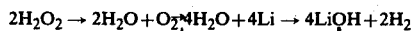

$$2H_2O_2 \rightarrow 2H_2O + O_2 + 4H_2O + 4Li \rightarrow 4LiOH + 2H_2$$

In the case of the embodiment illustrated in FIG. 3, with a total energy output of 2500 kw hours, the various energy contributions of each of the stages, the catalytic converter 24, the combustion chamber 110, and the reaction chamber 40 are illustrated in Table 1 below assuming an input of 333 lbs. of lithium and 895 lbs. of hydrogen peroxide fuels.

TABLE I

| Chamber | Output Energy |
| --- | --- |
| Catalytic Converter | 333 KW-HRS |
| First Vessel | 954 KW-HRS |
| Second Vessel | 1211 KW-HRS |

The above-described specific implementation for the preferred embodiment of the present invention is to be considered as exemplary only with alterations and improvements intended to fall within the scope of the invention as limited only in accordance with the following claims. It is to be noted that the term water is used in the following claims to mean water in either vapor or liquid phases consistent with its use above.

What is claimed is:

1. A closed cycle high energy density heat generating system comprising:
   a source of liquid hydrogen peroxide;
   means for receiving said liquid hydrogen peroxide for converting the received liquid hydrogen peroxide into water vapor and oxygen;
   a first reaction heat transfer vessel wherein said oxygen is combined with hydrogen in an exothermic reaction to produce water and heat;
   means for communicating said water vapor and oxygen from said converting means into said first reaction heat transfer vessel;
   a second reaction heat transfer vessel containing a reactant material wherein said reactant material combines in an exothermic reaction with said water from said first reaction heat transfer vessel to produce hydrogen and heat;
   means for communicating said water from said first reaction heat transfer vessel into said second reaction heat transfer vessel; and
   means for communicating the hydrogen from said second reaction heat transfer vessel to said first reaction heat transfer vessel.

2. The system of claim 1 further including means for applying said heat to heat a region.

3. The system of claim 1 further including means for converting said heat to mechanical energy.

4. The system of claim 1 wherein said converting means includes a Brayton cycle engine.

5. The system of claim 1 wherein said converting means includes a two-stage turbine.

6. A closed cycle, high energy heat generating system according to claim 1 including means for controlling the rate of flow of the material comprising:
   a first flow control valve disposed to control the flow of hydrogen peroxide from the source thereof to said receiving means;
   a second flow control valve disposed to control the flow of hydrogen peroxide from the source thereof to said receiving means;
   a first pressure sensor for pressure within said first reaction heat transfer vessel and including means for controlling said first flow control valve to provide a predetermined pressure control for said first reaction heat transfer vessel;
   a first temperature sensor for heat generated by said first reaction heat transfer vessel and including means for controlling said second flow control valve to provide a predetermined sensed temperature;
   a third flow control valve disposed to control the flow of hydrogen in said means for communicating hydrogen from said second reaction heat transfer vessel to said first reaction heat transfer vessel;
   said first pressure sensor including means for controlling said third flow control valve to provide a predetermined pressure in said first reaction heat transfer vessel;
   a fourth flow control valve disposed to control the flow of water by said means for communicating water from said first reaction heat transfer vessel to said second reaction heat transfer vessel;
   a second pressure sensor for sensing pressure in said second reaction heat transfer vessel and including means for controlling said fourth flow control valve to provide a predetermined control over the pressure of said second reaction heat transfer vessel.

7. A closed cycle, high energy density heat generating system comprising:
   a source of liquid hydrogen peroxide;
   a catalytic converter wherein said liquid hydrogen peroxide is converted into water vapor and oxygen;
   means for communicating said liquid hydrogen peroxide from said source into said catalytic converter;
   a first reaction heat transfer vessel wherein said oxygen from said catalytic converter combines with hydrogen in an exothermic reaction to produce water and heat;
   means for communicating said water vapor and oxygen from said catalytic converter into said first reaction heat transfer vessel;
   a second reaction heat transfer vessel containing lithium, wherein said lithium combines in an exothermic reaction with water from said first reaction heat transfer vessel to produce lithium hydroxide, hydrogen, and heat;
   means for communicating said water from said first reaction heat transfer vessel into said second reaction heat transfer vessel; and
   means for communicating said hydrogen from said second reaction heat transfer vessel to said first reaction heat transfer vessel.

8. A closed cycle, high energy density heating system according to claim 3 wherein at least one of said first and second reaction heat generating transfer vessels comprises:
   a reaction chamber containing the exothermic reaction;

a heat exchanger associated with said reaction chamber; and means cooperating with said heat exchanger to receive therefrom the heat of said exothermic reaction.

9. A closed cycle, high energy heat generating system according to claim 3 including:

means for maintaining predetermined pressures in said reaction heat transfer vessels.

10. A closed cycle, high energy heat generating system according to claim 3 including means for controlling the rate of flow of hydrogen peroxide to said catalytic converter in response to produced heat.

11. A method for producing heat from hydrogen peroxide and an active metal in a closed cycle, high energy density generating process, said method comprising the steps of:

dissociating said liquid hydrogen peroxide from a source thereof into water vapor and oxygen;

communicating said water vapor and oxygen into a first reaction heat transfer vessel;

combining said oxygen with hydrogen in an exothermic reaction to produce water and heat in said first reaction heat transfer vessel;

communicating water from said first reaction heat transfer vessel into a second reaction heat transfer vessel;

combining said water with said active metal in an exothermic reaction to produce heat, an hydroxide of said metal and hydrogen in said second reaction heat transfer vessel; and applying said hydrogen to said first reaction heat transfer vessel.

12. The method of claim 11 further including the step of converting said heat to mechanical energy.

13. A closed cycle high energy density energy generating system comprising:

a source of liquid hydrogen peroxide;

means for receiving said liquid hydrogen peroxide for converting the received liquid hydrogen peroxide into $H_2O$ and oxygen;

a first reaction vessel wherein said oxygen is combined with hydrogen in an exothermic reaction to produce $H_2O$ and energy;

means for communicating said $H_2O$ and oxygen from said converting means into said first reaction vessel;

a second reaction vessel containing a reactant material wherein said reactant material combines in an exothermic reaction with said $H_2O$ from said first reaction vessel to produce hydrogen and energy;

means for communicating said $H_2O$ from said first reaction vessel into said second reaction vessel; and means for communicating the hydrogen from said second reaction vessel to said first reaction vessel.

14. The closed cycle high energy density energy generating system of claim 13 wherein said energy is in the form of heat.

15. The closed cycle high energy density energy generating system of claim 13 wherein said energy is in the form of pressure.

16. The closed cycle high energy density energy generating system of claim 13 wherein the $H_2O$ from said first reaction vessel is in the liquid phase.

17. The closed cycle high energy density energy generating system of claim 13 wherein the $H_2O$ from said first reaction vessel is in the vapor phase.

18. A method for producing energy from hydrogen peroxide and an active metal in a closed cycle, high energy density generating process, said method comprising the steps of:

dissociating said liquid hydrogen peroxide from a source thereof into $H_2O$ and oxygen;

communicating said $H_2O$ and oxygen into a first reaction vessel;

combining said oxygen with hydrogen in an exothermic reaction to produce $H_2O$ and energy in said first reaction vessel;

communicating $H_2O$ from said first reaction vessel into a second reaction vessel;

combining said $H_2O$ with said active metal in an exothermic reaction to produce energy, an hydroxide of said metal and hydrogen in said second reaction vessel; and applying said hydrogen to said first reaction vessel.

* * * * *